T. ROLAND.
AERO-ANGLEMETER.
APPLICATION FILED SEPT. 24, 1917.

1,274,333.

Patented July 30, 1918.

Inventor
Theodore Roland
by Jerry A. Mathews,

UNITED STATES PATENT OFFICE.

THEODORE ROLAND, OF MENOMONIE, WISCONSIN.

AERO-ANGLEMETER.

1,274,333.

Specification of Letters Patent. Patented July 30, 1918.

Application filed September 24, 1917. Serial No. 192,922.

*To all whom it may concern:*

Be it known that I, THEODORE ROLAND, a citizen of the United States, residing at Menomonie, in the county of Dunn and State of Wisconsin, have invented a new and useful Aero-Anglemeter, of which the following is a specification.

The object of my invention is to provide an instrument to show a flier the relation of his machine to the ground. It is further my object to provide an instrument which can be conveniently adapted to the aeroplane, and which will enable aviators to take to the air in cloudy and foggy weather, and also in the dark, since it enables them to correctly judge the position of their machine in relation to the ground, even though they cannot see the ground. It is further my object to provide an improved instrument of this kind which can be easily read by the aviator, and which is of such improved construction as not to be deranged or broken by the vibration of the machine. It is further my object to provide a device in which the indicating liquid is prevented from making any wavy motion as a result of the vibration of the motor.

I attain the object of my invention by the mechanism illustrated in the accompanying drawings, in which.

Like characters of reference designate like parts throughout the several views.

Figure 1:
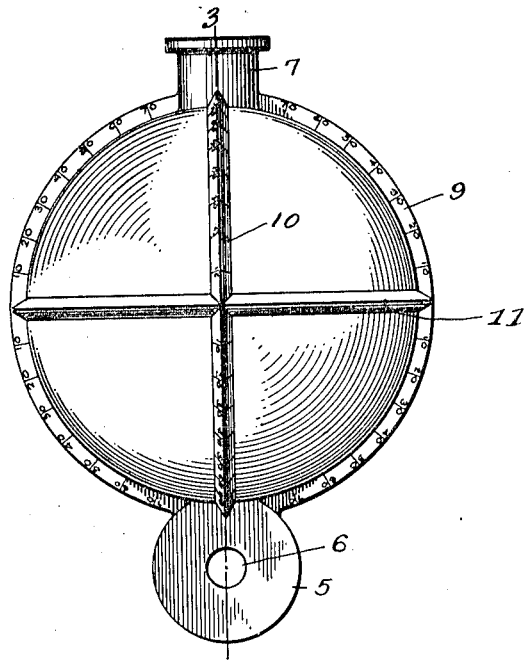
Figure 1 is a side elevation of the invention.
Figure 2:
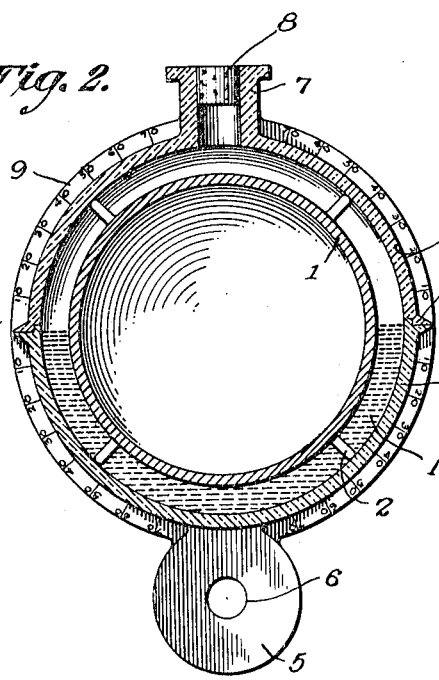
Fig. 2 is a vertical section approximately on the median line through the device.
Figure 3:
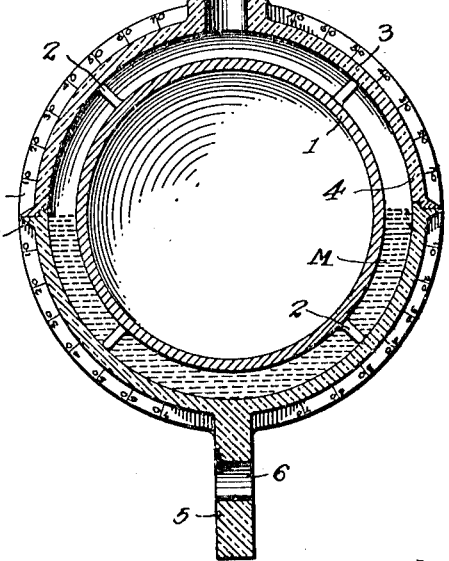
Fig. 3 is a vertical section taken at right angles to Fig. 2, on the line 3—3 of Fig. 1.

Referring to Figs. 2 and 3 of the accompanying drawings I provide a suitable inner globe 1, having suitable projections or spacing members 2, which may be of any suitable material, resilient if necessary, on which is mounted the outer transparent globe, preferably formed of hemispherical sections 3 and 4. Member 4 is provided with a suitable lug 5, having a suitable orifice 6, by means of which the angle-meter may be readily secured and adjusted on any suitable portion of the aeroplane in the proper position. The upper section 3 is preferably provided with a suitable mouth 7 and stopper 8.

The outer sphere of the instrument is graduated into proper degrees by marks on the encircling ribs 9, 10, and 11, the intersecting portions of which are disposed at right angles to each other, as shown, the markings on the vertically disposed ribs starting at zero at the intersection of the horizontal rib.

A suitable heavy liquid M such as mercury is contained within the instrument, which is filled exactly to the horizontal or center rib 11 with the liquid.

When the aeroplane tilts the instrument is tilted to the same degree which is indicated in the instrument by the level of the liquid relative to the markings on the vertical or horizontal encircling ribs or etched lines 9 and 10.

To illustrate the use of the invention, should the machine make a spiral descent or ascent, the level of the liquid or mercury will indicate the fact by its position in relation to the markings on the scale ribs or etched lines, thus, a dip forward of 45 degrees and a tilt to the side of 45 degrees is the spiral of descent or ascent.

By providing an inner and outer globe the liquid flows freely between the surfaces without any wavy motion being caused by the vibration of the motor.

It is within the contemplation of my invention to provide any suitable globe either formed of sections or of integral construction.

What I claim is:

1. An aero-anglemeter consisting of an inner globe and an outer transparent globe, spacing members between the globes, and a plurality of encircling scales on the surface of the outer globe, the scales being disposed of intersecting planes and a heavy liquid contained within the outer globe to indicate changes in the position of the instrument from the horizontal.

2. In an instrument of the class described, the combination of spaced globes, the outer globe being transparent, a heavy liquid contained between the globes to indicate changes of level of the instrument, a horizontal level indicator on the outer globe corresponding with the normal level of the liquid when the instrument is in correct position, and intersecting vertical ribs having graduated markings for the purpose described.

3. In a device of the type described, the combination of a transparent globe, the globe being formed of hemispherical sections and having a horizontal median rib, a heavy liquid contained within the globe, the surface of which is normally in alinement with the horizontal rib when the instrument is in upright position, and scales on the globe disposed in vertically intersecting planes at right angles to each other, and means for attaching the instrument.

4. In a device of the class described, the combination of an inner globe, an outer transparent globe, consisting of hemispherical sections, spacing members between the globes, a horizontal level indicator on the outer globe, intersecting graduated ribs disposed in vertical planes, means for readily securing the instrument in the required position and means for supplying the instrument with liquid, substantially as shown and set forth.

THEODORE ROLAND.